US008645611B2

(12) United States Patent
Tian

(10) Patent No.: US 8,645,611 B2
(45) Date of Patent: Feb. 4, 2014

(54) HOT-SWAPPING ACTIVE MEMORY FOR VIRTUAL MACHINES WITH DIRECTED I/O

(75) Inventor: Kun Tian, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/934,619

(22) PCT Filed: Mar. 31, 2010

(86) PCT No.: PCT/CN2010/071456
§ 371 (c)(1),
(2), (4) Date: Sep. 24, 2010

(87) PCT Pub. No.: WO2011/120223
PCT Pub. Date: Oct. 6, 2011

(65) Prior Publication Data
US 2013/0013877 A1    Jan. 10, 2013

(51) Int. Cl.
*G06F 12/00* (2006.01)
(52) U.S. Cl.
USPC .............................................. 711/6; 711/165
(58) Field of Classification Search
None
See application file for complete search history.

(56) References Cited

U.S. PATENT DOCUMENTS

| 6,247,079 | B1 | 6/2001 | Papa et al. | |
|---|---|---|---|---|
| 2006/0212671 | A1* | 9/2006 | Todd | 711/165 |
| 2007/0156968 | A1 | 7/2007 | Madukkarumukumana et al. | |
| 2008/0005495 | A1* | 1/2008 | Lowe et al. | 711/152 |
| 2008/0147945 | A1* | 6/2008 | Zimmer et al. | 710/260 |
| 2010/0332720 | A1* | 12/2010 | Chang et al. | 711/6 |

FOREIGN PATENT DOCUMENTS

CN        101031888        9/2007

OTHER PUBLICATIONS

International Search Report and Written Opinion mailed Dec. 30, 2010 for Int'l Patent Application No. PCT/CN2010/071456.
Waldspurger, C. A., Memory Resource Management in VMware ESX Server, ACM SIGOPS Operating Systems Review—OSDI '02: Proceedings of the 5th Symposium on Operating Systems, Design and Implementation, vol. 36, Issue SI, Winter 2002.
"International Preliminary Report on Patentability (Chapter I of the Patent Cooperation Treaty) mailed Oct. 11, 2012 for Int'l Patent Application No. PCT/CN2010/071456.", (Oct. 11, 2012), Whole Document.

* cited by examiner

*Primary Examiner* — Sanjiv Shah
*Assistant Examiner* — Daniel Tsui
(74) *Attorney, Agent, or Firm* — Blakely, Sokoloff, Taylor & Zafman LLP

(57) ABSTRACT

Embodiments of the invention describe a DMA Remapping unit (DRU) to receive, from a virtual machine monitor (VMM), a hot-page swap (HPS) request, the HPS request to include a virtual address, in use by at least one virtual machine (VM), mapped to a first memory page location, and a second memory page location. The DRU further blocks DMA requests to addresses of memory being remapped until the HPS request is fulfilled, copies the content of the first memory page location to the second memory page location, and ramps the virtual address from the first memory page location to the second memory page location.

13 Claims, 4 Drawing Sheets

HOT-SWAPPING ACTIVE MEMORY FOR VIRTUAL MACHINES WITH DIRECTED I/O

CROSS-REFERENCE TO RELATED APPLICATION

This patent application is a U.S. National Phase application under 35 U.S.C. §371 of International Application No. PCT/CN2010/071456, filed on Mar. 31, 2010, entitled HOT-SWAPPING ACTIVE MEMORY FOR VIRTUAL MACHINES WITH DIRECTED I/O.

FIELD

Embodiments of the invention generally pertain to system memory management, and more particularly to management of system memory assigned to virtual machines.

BACKGROUND

Systems including virtual machines (VMs) allow the sharing of an underlying physical machine and its resources. The software layer providing virtualization to the VMs is referred to as a virtual machine monitor (VMM) or hypervisor. A VMM acts as a host to the VMs. The VMM presents system software executing on the VMs (e.g., operating system software and application software) with an abstraction of the physical machine. The VMM is further able to retain selective control of processor resources, physical memory, interrupt management and data I/O.

I/O virtualization describes the capability for a single physical I/O unit to be shared by more than one VM. Prior art solutions accomplish I/O virtualization via a software module. Thus all accesses to VM memory pages are initiated from the CPU, and thereby incurring significant processing overhead. Furthermore, this type of virtualization does not allow devices assigned to VMs to execute memory operations directly via Direct Memory Access (DMA).

Other prior art solutions accomplish I/O virtualization via hardware logic, also known as directed I/O. In these solutions, a device's DMA requests are restricted to memory domains and memory regions assigned (by the VMM) to the VM that owns the device. One of these hardware prior art solutions may be described as DMA remapping hardware—i.e., a hardware unit positioned between the DMA capable peripheral devices and the system's physical memory. Unmodified drivers may run seamlessly in a VM will full privilege on I/O resources assigned to that VM; however, because DMA protection is enforced at the chipset level, access to physical memory outside of the VM-owned physical pages is prevented for I/O devices assigned to that VM.

Some advanced computer server memory features require the ability to "hot-remove" or "hot-swap" memory (e.g., removing DIMMs while they are in use). Hot swapping memory involves moving the content of (at least) one in-use page to another page, without breaking ongoing executions.

Hot-swapping memory is possible in the prior art if I/O virtualization is done via a software module. In this scenario, a VMM freezes the respective VM to prevent race access when page content is being swapped. After new mapping is established, the VM is thawed and subsequent memory accesses are redirected to newly mapped page.

However, there is no ability to hot swap pages of VM with I/O virtualization that allows directed I/O. This is due, in part, to the fact that a VMM can freeze VM execution, but has no control over devices assigned to said VM. These assigned devices can issue DMA requests to VM pages at any time, even when hot swapping of that page is in progress. This race condition is dangerous in that it may cause inconsistency between old and new pages.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Embodiments of the present invention relate to enhanced DMA functionality for VMs with directed I/O. Embodiments of the present invention allow for hot-swapping of active memory units (e.g., pages) in a race-free and efficient manner.

Example embodiments of the present invention describe an enhanced DMA remapping unit (DRU) at the chipset level. The enhanced DRU unit works in conjunction with a VMM. The DRU includes an interface to accept page swap-requests from the VMM. Upon receiving the request, the DRU executes the page swap while (at least partially) blocking DMA requests directed towards the page to be swapped.

Embodiments of the invention may be included in systems and servers that utilize features that require memory hot-swap capability. Said features include, for example, Reliability, Availability and Serviceability (RAS), memory low-power mode such as offline state (where power to DIMMs are cut off to save power), and Non-Uniform Memory Access (NUMA) node affinity wherein cross-node VM pages are reorganized to a single node when available memory resources change. These features require the ability to hot swap content of one in-use page to another, without breaking ongoing executions.

Figure 1:
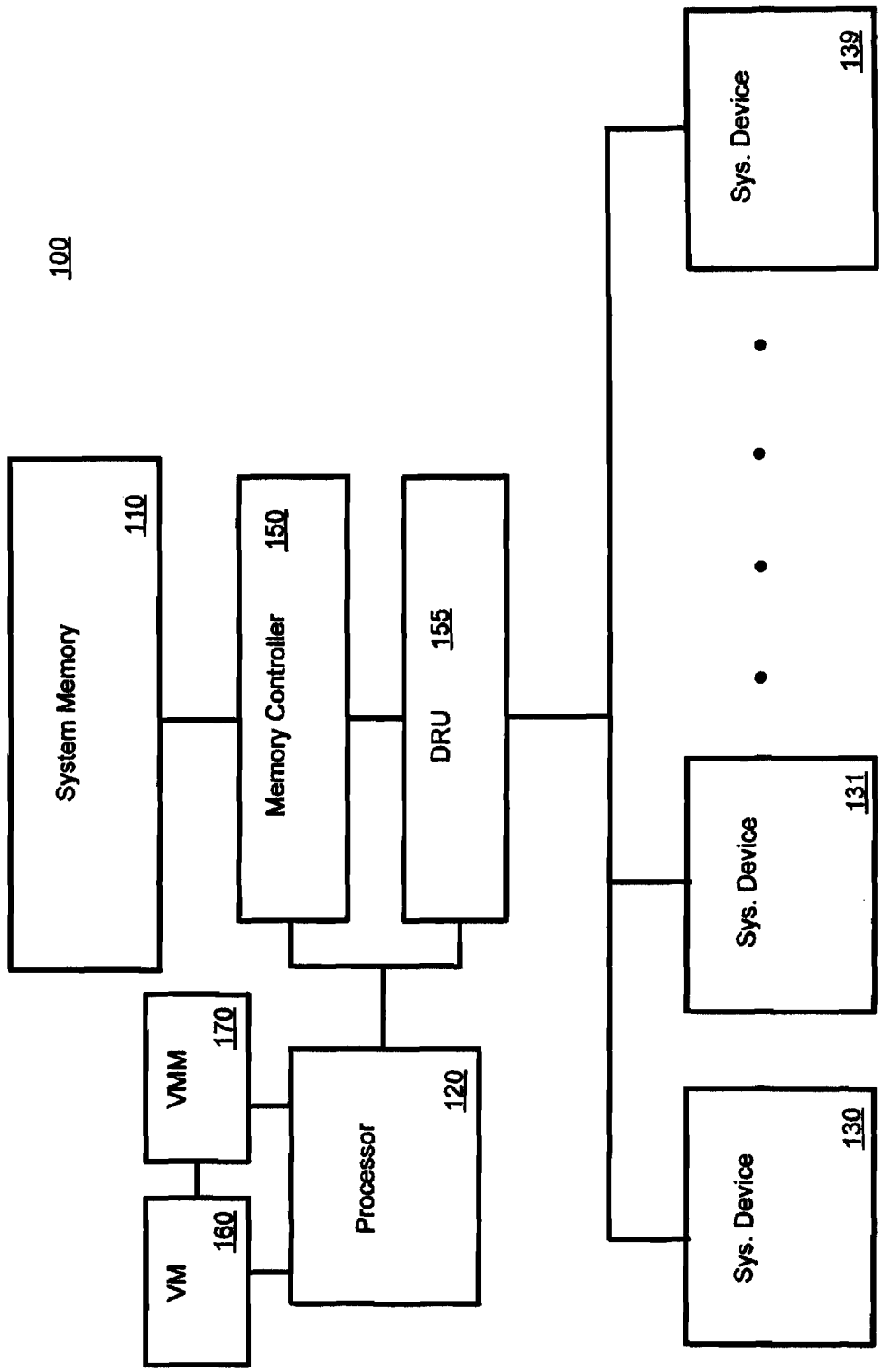
FIG. 1 is a block diagram of a system utilizing an embodiment of the invention.

FIG. 1 is a block diagram of a system utilizing an embodiment of the invention. System 100 may be included in a system server, desktop computer device, a mobile computer device, or any other any device utilizing a processor and system memory.

As shown in the example embodiment of FIG. 1, system 100 includes system memory 110, processor 120, system devices 130-139 (e.g., external disk drives, I/O devices) and memory controller 150. In this embodiment, devices 130-139 are DMA capable devices.

System 100 may further include VMM 170 to manage VM 160, including allocating portions of memory (i.e., pages) to VM 160. VM 160 may contain a guest operating system running various applications (i.e., guest software). Both VM 160 and VMM 170 may be executed via processor 120.

VMM 170 may further manage devices 130-139 and assign at least one of said devices to VM 160. In this example embodiment, devices 130, 131 and 139 are assigned to VM 160. It is to be understood that in alternative embodiments, a system may include a plurality of VMs, and system devices may be assigned to each VM in any combination.

The memory address range that guest software is provided, i.e. the Guest Physical Address (GPA) range, may not be the same as the Machine Physical Address (MPA) range. DMA capable devices 130, 131 and 139 use the MPA to transfer the data to and from physical memory locations. However, in this embodiment, the guest software of VM 160 (i.e., the guest OS) include device drivers to control devices 130, 131 and 139, and thus provide GPA ranges instead of MPA ranges.

DRU 155 is used to do the required address conversion. Since the GPA is provided by VMM 170, GPA ranges must be converted to MPA ranges. In one embodiment, VMM 170 programs DRU with the GPA to MPA conversion information so the DMA remapping hardware is able to perform the necessary translation. This conversion information is referred to herein as the DMA remapping page table (DRPT). Using the DRPT, data from a device can now be transferred directly to the appropriate memory address rather than going through an intermediate software emulation layer.

Memory 110 may comprise several units of memory, e.g., a plurality of DIMMs. The ability to "hot-remove" or "hot-swap" memory involves removing DIMMs while they are in use. Hot swapping memory involves, for example, moving the content of (at least) one in-use page included in a first DIMM (that is to be power down/moved) to another page included in a second DIMM (that will not be powered down/moved), without breaking ongoing executions. The operation to swap a page in this manner is referred to herein as a Hot Page Swap (HPS).

During the swapping of a page, it is important that no access is made to the page. VMM 170 can freeze execution of VM 160, thus preventing VM 160 from accessing the page to be swapped. VMM 170 can alternatively just freeze VM accesses to the page to be swapped. However, VMM 170 has no control over devices 130, 131 and 139 with regards to DMA requests each device may issue.

It is possible to modify the device drivers in VM 160 for each of devices 130, 131 and 139 to proactively freeze assigned devices. Before starting a page swap operation, VMM 170 may send a freeze request via VM 160 to the modified device drivers. The modified device drivers may then signal that it is safe to start the hot-swap operation. Upon completion of the hot-swap, VMM 170 may send an unfreeze request to the modified device drivers. However, this solution is not ideal for several reasons.

Commands to freeze/unfreeze (i.e., stop/resume) devices are time expensive operations. Uncertain latency is required to ensure all ongoing DMA requests for each device are drained, and further time is required to wait for each device to enter a quiescent state. This can further impact I/O throughput and affect system performance. This additional latency may further prevent hardware optimization. More importantly, modification to existing drivers is better to be avoided for well-known maintenance and distribution concerns.

Therefore, embodiments of the invention include enhanced DRU unit 155 to receive DMA requests from devices 130-139 and forward said requests to memory controller 150. DRU unit 155 also handles hot page swap requests issued by VMM 170. By removing hot swap execution from VMM 170, and thus removing VMM from having to eliminate race conditions, device DMA requests are controlled in a more efficient manner.

Figure 2:
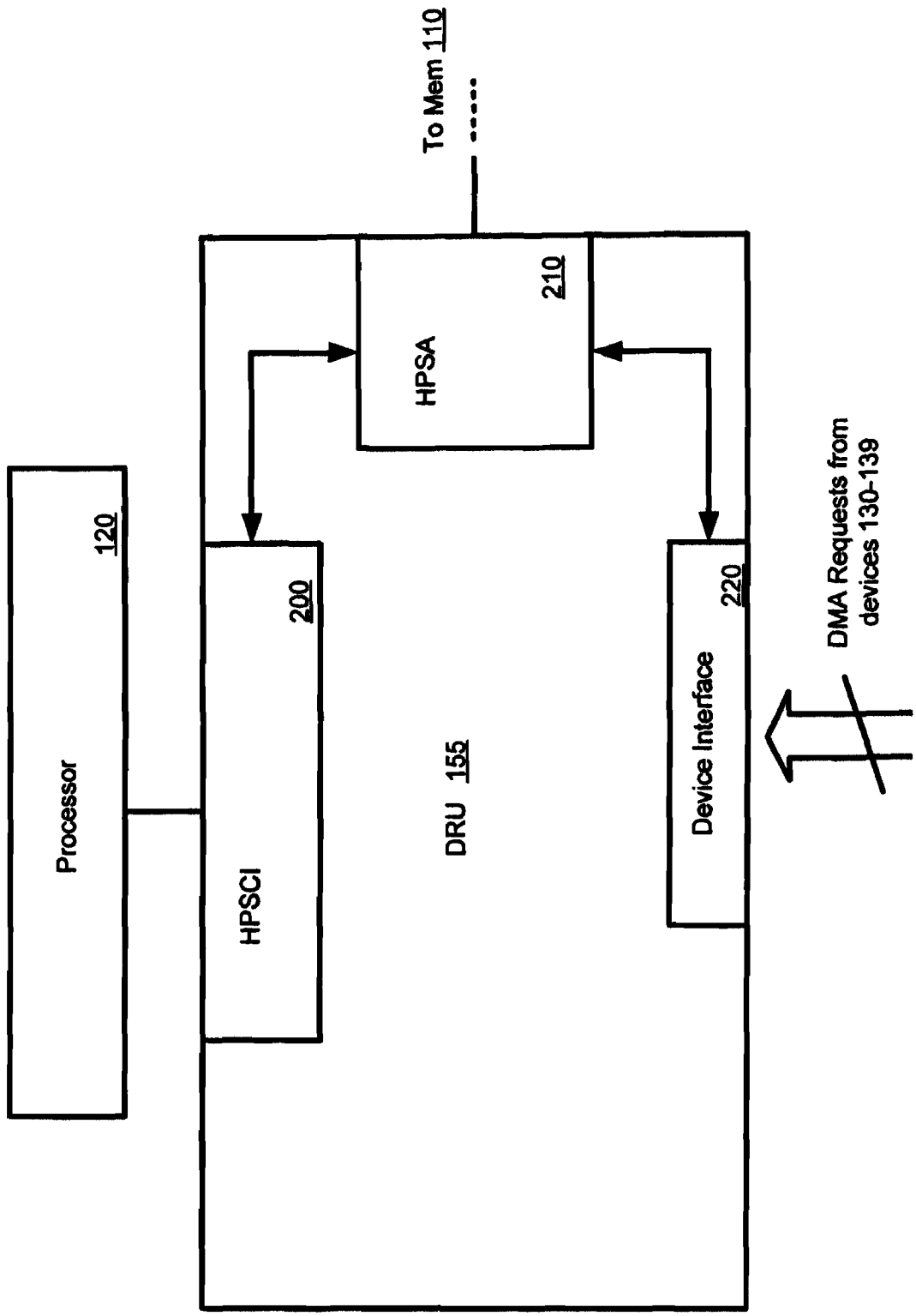
FIG. 2 is a block diagram of an embodiment of a DMA Remapping Unit.

FIG. 2 is a block diagram of DRU 155 according to an embodiment of the invention. DRU 155 includes Hot Page Swap Command Interface (HPSCI) 200, through which the system VMM can notify the DRU of an HPS request.

An HPS request generated by the VMM may include information indicating the target Guest Page Frame Number (GPFN) to be updated, the original Machine Page Frame Number (MPFN) mapped by the target GPFN, the new MPFN to be mapped by the target GPFN, and a status field to indicated error and completion information for the HPS request. The GPFN may alternatively be referred to as a "virtual address." It is to be understood that the original MPFN and new MPFN are included in system memory 110.

HPSCI 200 performs various validation checks on an HPS request. For example, HPSCI 200 may ensure the mapping of the target GPFN is consistent with the original MPFN, or if the requested swap cannot be completed because the memory is not assigned to the issuing VM.

After an HPS request is validated, Hot Page Swap Agent (HPSA) 210 may execute the page swap. HPSA 210 reads out the contents from the original MPFN, and then writes to the new MPFN. In one embodiment, these memory access requests are interleaved with on-going device DMA requests. Upon finish of the memory copy, HPSA 210 then changes the DRPT to reflect the latest mapping of the target GPFN to the new MPFN. HPSA 210 may further invalidate the internal DMA Remapping TLB to avoid stale mapping entries after the HPS is executed.

DRU 155 further includes device interface 220 to accept and fulfill DMA requests for system devices. Thus, DRU 155 has control over device DMA requests (as opposed to the VMM), and can block DMA requests to pages being swapped if necessary.

Figure 3:
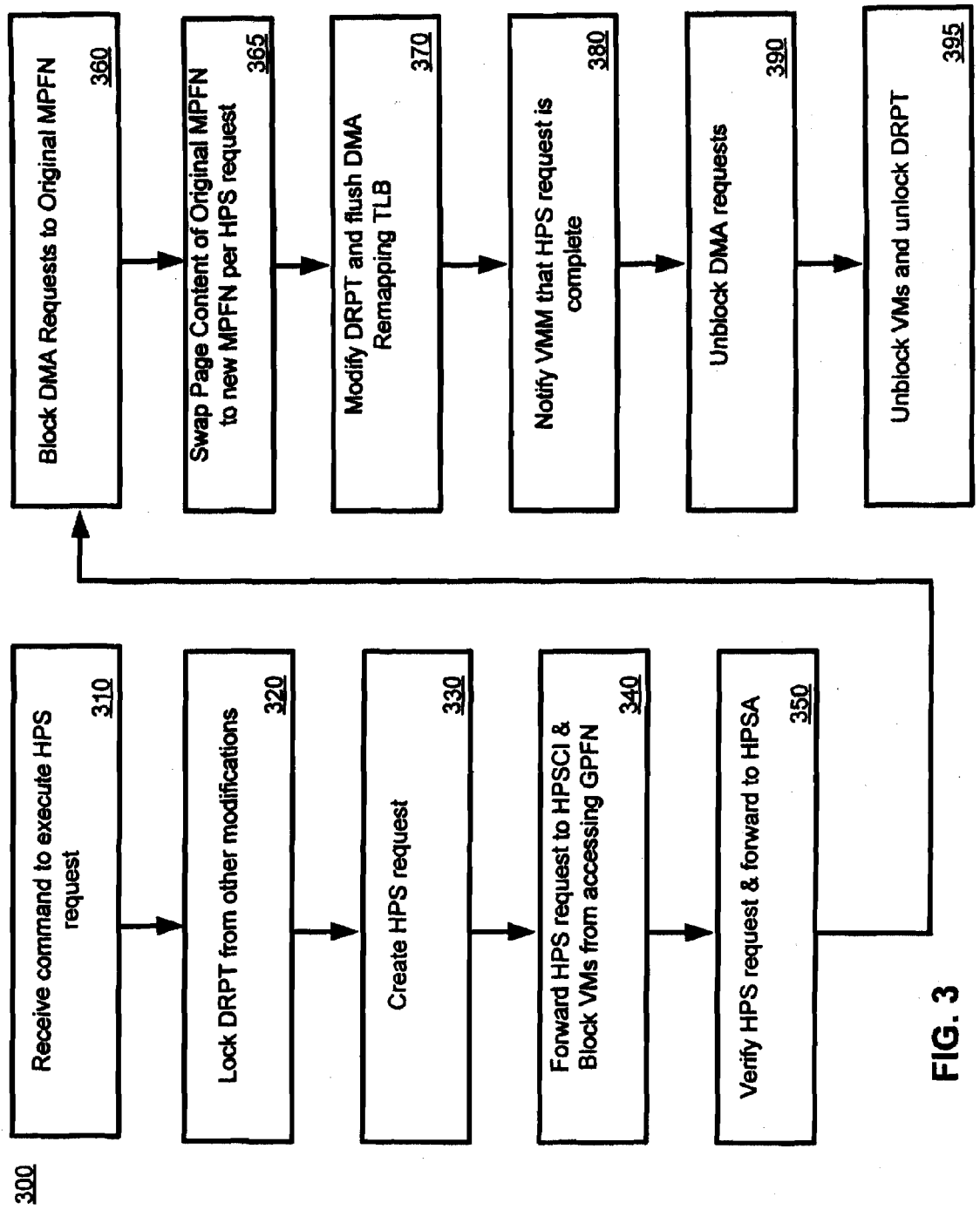
FIG. 3 is a flow diagram of processing a hot page swap request according to an embodiment of the invention.

The HPSCI described above may be implanted in a synchronous or asynchronous manner. FIG. 3 is a flow diagram of an HPSCI processing an HPS request according to an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

Process 300 begins with a VMM receiving a command to execute an HPS request, 310. This HPS request may be a processor instruction issued to the VMM. The VMM will lock the DRPT from being modified by other commands in response to receiving said command, 320.

The VMM compiles the necessary hot-swap information, such as target GPFN, original MPFN and new MPFN, into an HPS request, 330. VMM sends the HPS request to an HPSCI of a DRU while also blocking VMs from accessing the corresponding GPFN, 340. In this embodiment, the VMM is further blocked from receiving other HPS requests.

The HPSCI will then verify and forward the HPS request to the HPSA, 350. Access to the original MPFN should be blocked during the HPS operation. As mentioned above, VMs are blocked from accessing the original MPFN (via the corresponding GPFN). Devices must also be blocked from accessing the original MPFN via DMA requests. This blocking is done via the DRU, 360.

The HPS request is then fulfilled by swapping the content of the original MPFN to the new MPFN, 365. The HPSA further modifies the DRPT and flushes the DMA Remapping TLB, 370. The HPSA notifies the HPSCI that the HPS request has been fulfilled, and the HPSCI furthers this notification to the VMM, 380. The DRU unblocks DMA requests from system devices, 390. The VMM unblocks the VMs and unlocks the DRPT, 395.

In an alternative embodiment, the HPSCI is implemented in an asynchronous manner. In this embodiment, the VMM is not blocked from receiving other HPS requests during the hot-swap operation. In this embodiment, VMM can continue to queue other HPS requests, and the HPSCI may handle these queued requests in parallel. In one embodiment, the VMM sets a threshold for the number of parallel requests that may be serviced.

In the example embodiment discussed above, devices are prevented from issuing a DMA requests during the host-swap process. These DMA requests may be held in some internal buffer, either at the DRU or on each device, and may be processed only when new mapping is re-established. This embodiment runs the risk of buffer overflow if too many DMA requests are issued during a hot-swap operation, and overall performance may be negatively affected.

Figure 4:
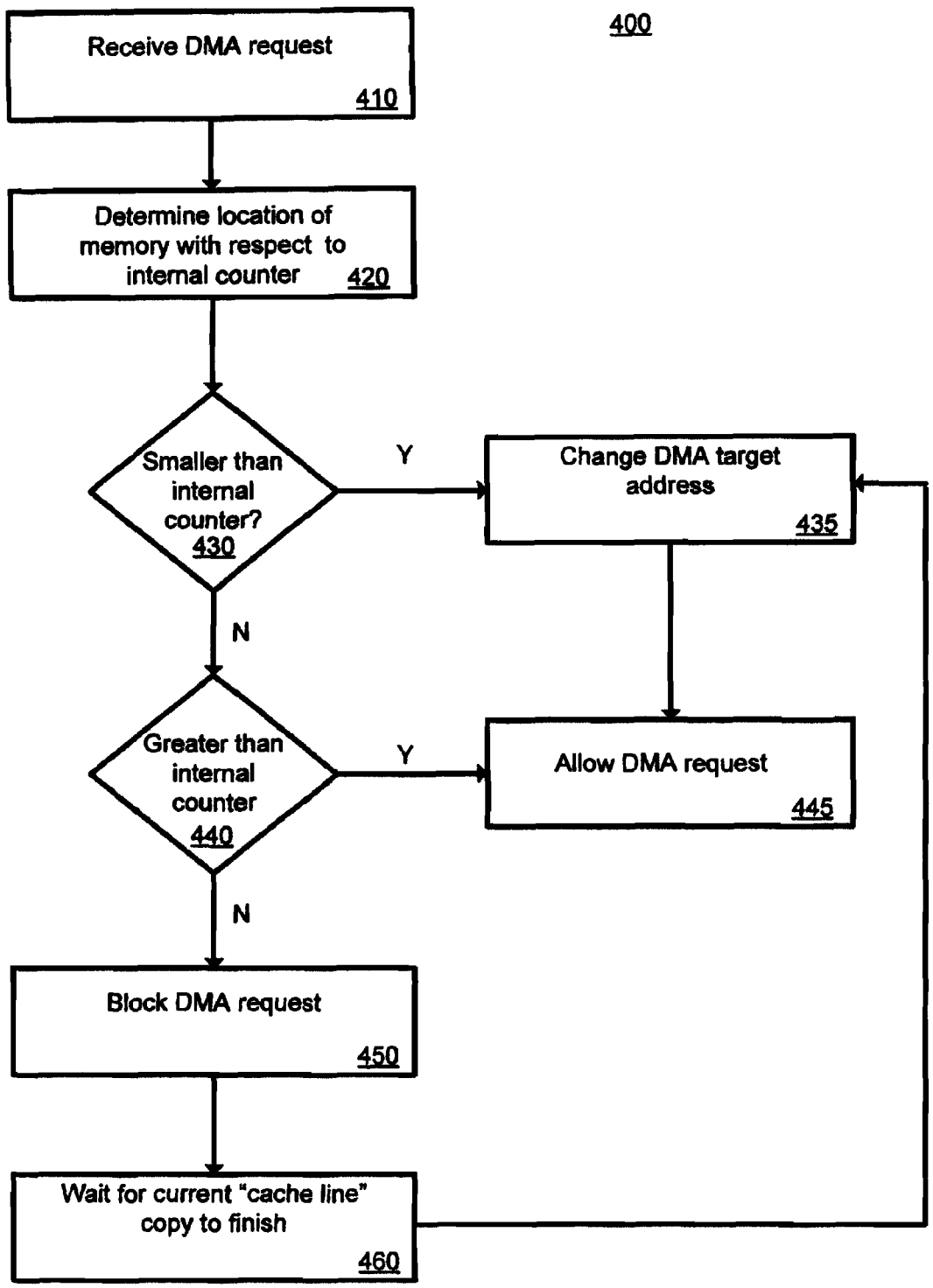
FIG. 4 illustrates an example process that minimizes the number of DMA requests that need to be blocked during a hot page swap operation.

FIG. 4 illustrates an example process that minimizes the number of DMA requests that are blocked during an HPS operation. As discussed above, to hot swap an in-use page, the whole content of the old page has to be copied to the new page. This copy process must ensure the new page includes latest content.

In some systems, there are still DMA accesses (i.e. write-ops) issued from system devices even though the VM that owns these devices is blocked. Furthermore, though guest software usually manages memory in page units (i.e., 4 Kb), memory controllers often accept burst accesses to memory DIMMs in cache line units (i.e., 64 bytes).

Thus, copying an old page to a new page incurs dozens of "cache line" copies—e.g., if one page is to be hot-swapped, then there are 64 "cache line" sized writes that occur for that operation. While it is easier to block device DMA requests until a whole page copy is finished, it adds latency and risk of device internal buffer overflow. Process 400 illustrates handling HPS operations and DMA requests in an interleaved manner, therefore allowing device to access an in-swap page in most cases.

In this embodiment, an internal counter is used to track which "cache line" is currently being copied during an HPS operation. Thus, when the DRU receives a device DMA request, 410, the DRU determines the location of the memory requested in relation to the internal counter, 420.

If the DMA request is to a "cache line" smaller than the internal counter, 430, this indicates that this particular potion of memory has already been swapped, so the DMA target address will be changed and instead targeted to the new "cache line" location (i.e., the new MFPN), 435. The updated DMA request is then allowed, 445.

If the DMA request is to a "cache line" larger than the internal counter, 440, this indicates that this particular potion of memory has not been swapped, and it is still safe to allow the DMA request to original "cache line" location (i.e., the original MFPN), 445.

If the DMA request is to a "cache line" equal to the internal counter, this indicates that this particular potion of memory currently being swapped, and therefore this DMA request must be blocked to prevent a race condition or memory inconsistency, 450.

In one embodiment, the DRU unit waits for the current "cache line" to be swapped, 460, and then updates the target address of the (now unblocked) DMA request to the new MPFN (i.e., operation 435). The updated DMA request is then allowed, 445. It will be understood that the example process of FIG. 4 reduces the number of DMA requests that need to be blocked during an HPS operation.

Various components referred to above as processes, servers, or tools described herein may be a means for performing the functions described. Each component described herein includes software or hardware, or a combination of these. The components can be implemented as software modules, hardware modules, special-purpose hardware (e.g., application specific hardware, ASICs, DSPs, etc.), embedded controllers, hardwired circuitry, etc. Software content (e.g., data, instructions, configuration) may be provided via an article of manufacture including a computer storage readable medium, which provides content that represents instructions that can be executed. The content may result in a computer performing various functions/operations described herein. A computer readable storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable storage medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

What is claimed is:

1. A system comprising:
    a memory;
    a processor;
    a virtual machine (VM) executed via the processor;
        a virtual machine monitor (VMM) executed via the processor to control the VM's access to the memory and the processor,
        issue a hot-page swap (HPS) request, the HPS request to include a virtual address in use by at least one of the VM and a device assigned to the VM, a first memory page location mapped to the virtual address, and a second memory page location, and
        block access to the virtual address from the VM until the HPS request is complete; and
    a DMA Remapping Unit (DRU) operatively coupled to the processor and the memory to receive and verify the HPS request,
        copy content of the first memory page location to the second memory page location;

track, via a counter, memory locations of content being copied from the first memory page location to the second memory page location, remap the virtual address from the first memory page location to the second memory page location, and block Direct Memory Access (DMA) requests from one or more devices assigned to the at least one VM and one or more devices not assigned to the at least one VM to addresses of memory being remapped until the HPS request is complete, said devices comprising peripheral, non-virtualized devices, wherein blocking DMA requests includes determining the DMA requests in relation to the counter, blocking DMA requests for locations greater that a value of the counter, and allowing DMA requests for locations less than the value of the counter.

2. The system of claim 1, the DRU to further block all DMA requests to the first memory page location until the HPS request is fulfilled.

3. The system of claim 1, the VMM to further block additional HPS requests until the HPS request is complete.

4. The system of claim 1, the VMM to further queue additional HPS requests, the DRU to process additional HPS requests in parallel with the HPS request.

5. The system of claim 1, the HPS request to enable at least one of power to be cut off to the first memory page location, and
memory reorganization of the first memory page location.

6. A method comprising:

receiving and verifying, from a virtual machine monitor (VMM), a hot-page swap (HPS) request, the HPS request to include a virtual address in use by at least one virtual machine (VM), a first memory page location mapped to the virtual address, and a second memory page location;

copying content of the first memory page location to the second memory page location;

tracking, via a counter, memory locations of content being copied from the first memory page location to the second memory page location;

blocking Direct Memory Access (DMA) requests from one or more devices assigned to the at least one VM and one or more devices not assigned to the at least one VM to addresses of memory being remapped until the HPS request is complete, said devices comprising peripheral, non-virtualized devices, wherein blocking the DMA request includes:

determining the DMA requests in relation to the counter;
blocking DMA requests for locations greater that a value of the counter; and
allowing DMA requests for locations less than the value of the counter; and remapping the virtual address from the first memory page location to the second memory page location.

7. The method of claim 6, further comprising blocking additional HPS requests until the HPS request is complete.

8. The method of claim 6, further comprising processing additional HPS requests in parallel with the HPS request.

9. The method of claim 6, further comprising cutting off power to the first memory page location.

10. The method of claim 6, further comprising reorganizing the memory of the first memory page location.

11. An apparatus comprising:

a first circuitry to receive and verify a hot-page swap (HPS), the HPS request to include a virtual address, a first memory page location mapped to the virtual address in use by at least one virtual machine (VM), and a second memory page location;

a second circuitry to copy content of the first memory pane location to the second memory pane location, and to remap the virtual address from the first memory pane location to the second memory pane location;

a counter to track memory locations of content being copied from the first memory page location to the second memory page location via the second circuitry; and a device interface to receive DMA requests, the device interface to block Direct Memory Access (DMA) requests from one or more devices assigned to the at least one VM and one or more devices not assigned to the at least one VM to addresses of memory being remapped until the HPS request is complete, said devices comprising peripheral, non-virtualized devices, wherein blocking DMA requests includes:

determining the DMA requests in relation to the counter;
blocking DMA requests for locations greater that a value of the counter; and
allowing DMA requests for locations less than the value of the counter.

12. The apparatus of claim 11, the first circuitry to further process additional HPS requests in parallel with the HPS request.

13. The apparatus of claim 11, the HPS request to enable at least one of power to be cut off to the first memory page location, and
memory reorganization of the first memory page location.

* * * * *